No. 622,348. Patented Apr. 4, 1899.
E. HAIMAN & C. BISHOP.
WHEEL CULTIVATOR.
(Application filed Nov. 6, 1897.)

(No Model.)

ATTEST

INVENTORS
Chas Haiman
Clark Bishop
By H. J. Fisher Atty

UNITED STATES PATENT OFFICE.

ELIAS HAIMAN AND CLARK BISHOP, OF CLEVELAND, OHIO, ASSIGNOR TO THE EMPIRE PLOW COMPANY, OF SAME PLACE.

WHEEL-CULTIVATOR.

SPECIFICATION forming part of Letters Patent No. 622,348, dated April 4, 1899.

Application filed November 6, 1897. Serial No. 657,719. (No model.)

*To all whom it may concern:*

Be it known that we, ELIAS HAIMAN and CLARK BISHOP, citizens of the United States, residing at Cleveland, in the county of Cuyahoga and State of Ohio, have invented certain new and useful Improvements in Wheel-Cultivators; and we do declare that the following is a full, clear, and exact description of the invention, which will enable others skilled in the art to which it appertains to make and use the same.

Our invention relates to improvements in wheel-cultivators; and the invention consists in an improvement on a cultivator patented November 10, 1896, in the name of Haiman, Huettich, and Bishop as the inventors. In the said cultivator there appears, among other objections to the construction therein, the objection of having the rear wheel traveling over the furrow of the rear tooth. Obviously, now, when this occurs the tooth must carry the cultivator, as the wheel would simply be suspended. If it be not suspended, it must be independently adjusted to travel in the furrow. All this is objectionable, even if the said wheel reached the ground, for then the ground would be plowed, and therefore uncertain as a bearing for the wheel, and it would most likely incur lumps to make its work very irregular. To overcome this material objection to the old construction, we have devised the present invention, in which the rear wheel is supported where it will travel on the unbroken or unplowed ground in the line of the front wheel and in front of the rear central tooth, so that the rear wheel will have the same bearing and be subject to the same conditions as the front wheel and there will be no wheel-track left on the cultivated ground. This of course would be impossible if the rear wheel were placed at the extreme rear of the cultivator after the manner of the patent above referred to, and hence the present improved construction, whereby the objections hereinbefore enumerated and others are overcome and a uniform and regulated action of the cultivator is rendered possible by a similar and simultaneous operation of both wheels.

Figure 1:
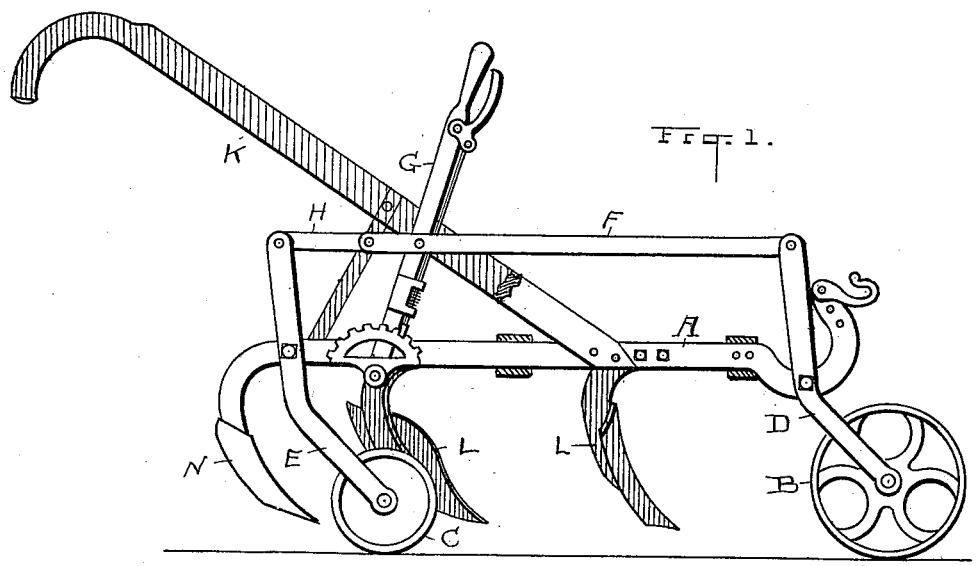
Figure 2:
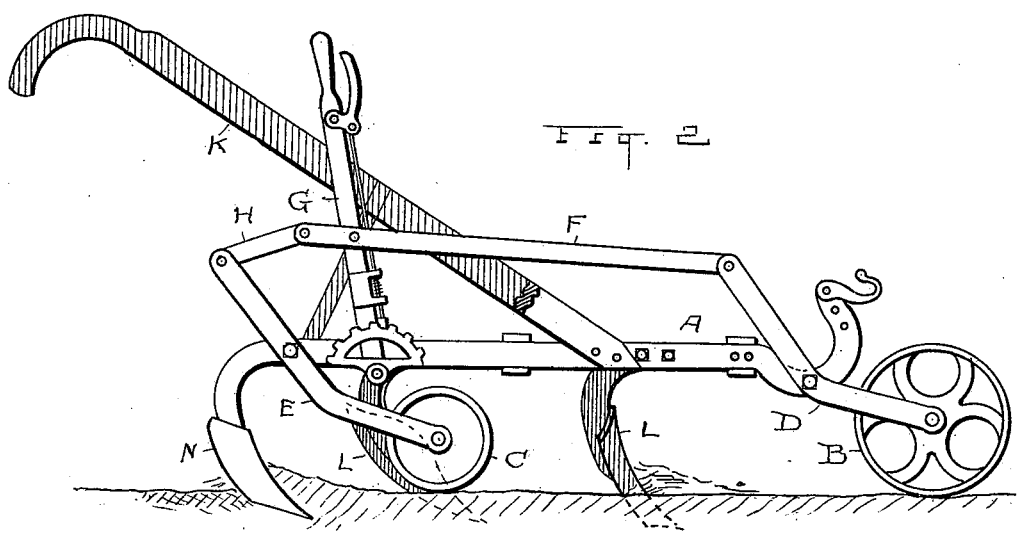
Figure 3:
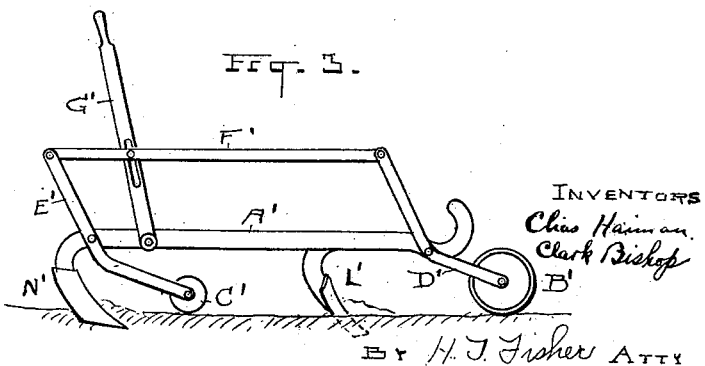

In the accompanying drawings, Figure 1 is a longitudinal sectional elevation of the cultivator, showing the wheels down, as occurs when the implement is being hauled to and from the field. Fig. 2 is a longitudinal sectional elevation of the cultivator, showing it as it appears when engaged at work and the wheels are adjusted to set the teeth at a given depth of operation. Fig. 3 is an elevation of a modification.

A represents the frame of the cultivator, which may be of any desired style and which is adapted to carry cultivator-teeth, plows, or scrapers or such other attachments as are interchangeable on frames of this kind, the idea being that the implement should be adapted to cultivate corn, cotton, and the like and to this end have means for more or less lateral adjustment to adapt it to rows of different widths and to closer or farther work from the row or rows being cultivated.

In all implements of this general kind it is desirable to have means not alone for carrying them from place to place, but for graduating their depth of work so as to regulate the work according to the needs of the plant or the character of the soil or other conditions which require changes to be made. In order to carry the cultivator and make such vertical adjustments thereof as shall be found necessary, we employ two wheels B and C, supported, respectively, on standards D and E. These standards are designed to be substantially alike in construction and operation, and in so far as their construction is concerned both of said standards are pivoted on the frame A some distance from their upper ends, so as to leave a leverage above said pivots, and are so arranged that both wheels will run on the same unbroken or uncultivated ground, one in the path of the other.

F represents a long connecting link, bar, or rod which is connected at or near its front end to the upper part of the standard D and at or near its rear end to the lever G, but is shown as extending beyond said lever to the rear to form a pivot connection for the short link H, which connects with the upper portion of the rear standard E. If preferred, the link H may connect the said standard directly to the lever G either above or below or at the side of the bar F and serve the same purpose; but the present construction is preferred. Both standards D and E are connected and operated in like manner by lever G, and they give the same results in operation and secure a uniform raising and lowering of the implement front and rear when the handle is operated back and forth. The said standards D and E may be single pieces with bifurcated or double extremities to engage the wheels C and B or they may consist each of two parts extending their full length and connected so as to operate and serve as one standard in each case. These or any equivalent construction may be used.

The foregoing construction places the implement absolutely under the control of the operator through lever G to be regulated with the utmost nicety and certainty at any moment to change the depth of operation, and he can regulate the depth as frequently as the peculiarity of the soil or other conditions may suggest or require. When set to a given depth, the cultivator will run at that depth without any effort on the part of the operator to hold it at such depth or need to do anything except to direct the line of movement. Both the cultivator-teeth L and L shown in the drawings will be understood as being on the other or opposite side of the line of the travel of the two wheels B and C, while the rear tooth N at the rear of the wheel C is in the same line of travel as said wheel.

In Fig. 3 we show a modification in which the two wheel-standards D' and E' are connected directly with the ends of connecting-bar F', and the handle G' is slotted longitudinally, and a pin or the like in said bar operates in said slot, so that by the manipulations of the handle the same adjustment of the wheels is obtained as in Figs. 1 and 2. In this case also the tooth L' is out of line of travel with wheels B' and C' and the rear tooth N' is in line with said wheels.

What we claim is—

The cultivator-frame and a set of teeth, one tooth centrally at the rear, single wheels centrally at the front and at the rear of the frame, respectively, one behind the other in the same line of travel, and a supporting-standard for each wheel pivoted between its ends on said frame, an operating-lever and link connections between said lever and the said standards to control the elevations of the said wheels, the rear wheel being located immediately in advance of the said central rear tooth, and the front wheel centrally at the front of the cultivator, whereby both wheels are caused to travel on the same ground and level one behind the other, substantially as described.

Witness our hands to the foregoing specification this 14th day of October, 1897.

ELIAS HAIMAN.
CLARK BISHOP.

Witnesses:
L. F. FOGG,
W. H. HERMAN.